Patented May 21, 1935

2,002,067

UNITED STATES PATENT OFFICE 2,002,067

COLD VULCANIZATION OF RUBBER

Douglas Frank Twiss, Wylde Green, Albert Edward Toney Neale, Ward End, and John Alexander Wilson, Erdington, England, assignors to Dunlop Tire & Rubber Corporation, Buffalo, N. Y., a corporation of New York No Drawing. Application December 13, 1933, Serial No. 702,198. In Great Britain December 22, 1932

4 Claims. (Cl. 18—53)

This invention relates to improvements in the manufacture of vulcanized rubber compositions and particularly to cold vulcanization with sulphur chloride.

The object of the invention is to accelerate the rate of cold vulcanization with sulphur chloride.

The use of accelerators of vulcanization has already been described in the specification of patent numbered 327,164 in connection with the production of thin artificial masses which no longer show the extensibility of products made from natural india-rubber by a process comprising treating soft artificial masses prepared from synthetic polymerization products of diolefines or mixtures of these with india-rubber with a sulphurizing agent preferably of a volatile nature at a temperature not exceeding 100° C.

The present invention, however, consists in the ability to produce soft extensible rubber masses which retain their extensibility and is therefore suitable for use in the manufacture of rubber goods, such for instance, as rubber proofing on fabrics, rubber sheeting and cycle valve tubing.

It is well known from its very character that cold vulcanization with sulphur chloride is much more rapid than heat vulcanization with sulphur and from the mere point of view of shortening the required time, it has not been of importance to attempt any acceleration of the rate of vulcanization with sulphur chloride.

On the other hand, the acceleration and intensification of the action of sulphur chloride is of distinct advantage particularly in the so-called vapour cure in which sulphur chloride in a vapourized condition is applied to the rubber either alone or admixed with vapour of carbon disulphide or other suitable diluent. Acceleration or intensification of the action in such cases enables the operation to be carried out with less inconvenience from leakage or liberation of surplus sulphur chloride and other vapours. A similar advantage is also present in the use of solutions of rubber.

According to this invention, we provide the method of cold vulcanizing rubber compositions with sulphur chloride by vulcanization in the presence of one or more substances which accelerate the action of the sulphur chloride, characterized in that the said substances comprise a nitrogen compound or compounds containing the structural arrangement NR′R″.CS.R‴ where R′ and R″ represent a bivalent organic radicle or two univalent organic radicles, and R‴ represents hydrogen or a univalent organic group of dithiocarboxylic type.

In particular modifications of the invention R‴ represents hydrogen and R′ and R″ represent two univalent hydrocarbon groupings, or R‴ represents hydrogen and R′ and R″ represent a bivalent hydrocarbon grouping. Again, R‴ represents hydrogen, R′ an aromatic hydrocarbon grouping and R″ a univalent organic grouping of the composition CS.NHR″″ where R″″ is an aromatic radical.

In a further modification R‴ represents hydrogen and R′ and R″ represent a bivalent organic grouping $C_6H_4S.CS$.

Furthermore R′ and R″ may represent two univalent alkyl groups and R‴ a univalent organic grouping of the composition CS.SX′ where X′ represents a metal or a complex metallic radical, and in a modification R′ and R″ may represent a bivalent organic radical.

In a further modification R′ and R″ represent two univalent alkyl groups and R‴ a univalent organic grouping of the composition CS.SX′ where X′ represents an organic grouping of aminothioformyl or dithiocarbonyl structure, and in a modification R′ and R″ may represent a bivalent hydrocarbon grouping.

It will be noted that these substances are not all accelerators of vulcanization by heat and there is no parallelism: for example, zinc isopropylxanthate which is a very powerful accelerator of vulcanization by sulphur gives an almost inappreciable or even negative effect with vulcanization by sulphur chloride whether zinc oxide is present or not; zinc dithiofuroate also has no accelerating effect on vulcanization with sulphur chloride.

The invention is further characterized in that the sulphur chloride may be applied to the rubber in fluid form as a vapour or liquid and it may be admixed with a diluent such as carbon disulphide and also in the fact that vulcanization may be effected in the absence of zinc oxide.

The following examples illustrate how the cold-vulcanization operation with sulphur chloride is improved when carried out according to the present invention. The examples refer mainly to experiments with dissolved rubber, but the invention can be applied equally well to dry rubber e.g., by incorporating the accelerator in the rubber for instance by milling or by a diffusion method.

EXAMPLE 1A

Using a 5% solution of masticated pale crepe rubber in benzene and adding to 25 cc. thereof 4 cc. of a 2% solution of sulphur chloride in benzene, the progress of cold vulcanization can be followed by the time required before the rubber attains such a condition of vulcanization that the solution sets to a jelly.

When small quantities of the various substances indicated below are added, namely, 2% of the weight of the rubber, the time of gelation is decreased.

Time of gelation
A=Rubber plus sulphur chloride alone. Approx._____minutes__ 30
B=A plus diphenylguanidine____do____ 26
C=A plus diphenylguanidine polysulphide _____ do____ 26
D=A plus piperidine_____do____ 3 to 4
E=B plus 0.5 grams of carbon disulphide (piperidine piperidine-carbothionolate) _____do____ 2 to 3
F=A plus aniline_____do____ 20 to 25
G=A plus mercaptobenzothiazole_____do____ 15
H=A plus diethyldithiocarbamate of zinc. About__seconds__ 1
J=A plus ammonia (proportion uncertain)_____minutes__ 20 to 25

EXAMPLE 1B 20 cc. of 7.5% rubber solution+0.05 gram of substance+4 cc. of 5% sulphur chloride solution Time of gelling
Blank—no added substance_____minutes__ 4
Thiocarbanilide _____do____ 1
Sodium piperidinecarbothionolate__seconds__ 40
Tetramethyl thiruam monosulphide___do____ 35

Experiments with above quantities on a different day with different atmospheric conditions.
Blank—no added substance_____2 mins. 30 secs.
Thiourea_____ 2 mins. 50 secs.

EXAMPLE 2

The above results suggest that with such a material as zinc diethyldithiocarbamate not only can the time of vulcanization be reduced, but the proportion of sulphur chloride can also be reduced with advantage not only to the operating conditions but also to the product. The possibility is confirmed by a test in which 25 cc. of a 7% solution of masticated smoked sheet rubber in petroleum naphtha is mixed with 4 cc. of a 2% solution of sulphur chloride in benzene. The time required for gelation is 10 to 12 minutes.

In a second experiment a similar quantity of the same solution to which 2% (on the rubber) of zinc diethyldithiocarbamate has been added is treated with 1 cc. of sulphur chloride solution. In spite of the fact that the proportion of sulphur chloride used is reduced to one fourth, the time required for gelation is only 1 to 1½ minutes. The character of the gel is evidence that the vulcanization is quite satisfactory and indeed even better than with the larger proportion of sulphur chloride without accelerator as the vulcanized rubber gel has greater mechanical strength.

The presence of zinc oxide does not assist the action of these accelerators of vulcanization by sulphur chloride but actually retards the action and impairs the results, the product which contains zinc oxide showing a marked tendency to increased rate of deterioration.

EXAMPLE 3A

Using 20 cc. of 5% solution of rubber in benzene containing 0.02 gram of accelerator with or without the additional presence of 0.02 gram of zinc oxide, the following time periods are necessary, after the addition of 5 cc. of a 1% solution of sulphur chloride in benzene, before the vulcanization results in the formation of a jelly:—

| | Accelerator | Zinc Oxide | Time |
|---|---|---|---|
| A | Nil | Nil | 10 minutes. |
| B | Nil | Present | 11 minutes. |
| C | Zinc diethyldithiocarbamate | Nil | 15 to 30 secs. |
| D | Zinc diethyldithiocarbamate | Present | 30 to 60 secs. |
| E | Zinc Isopropylxanthate | Nil | 10 to 12 secs. |
| F | Zinc Isopropylxanthate | Present | 20 minutes. |
| G | Mercaptobenzothiazole | Nil | 6 minutes. |
| H | Mercaptobenzothiazole | Present | 15 minutes. |

EXAMPLE 3B

The following substances which are effective as accelerators of ordinary vulcanization with sulphur and heat are ineffective as accelerators of vulcanization with sulphur chloride and indeed in some cases show an adverse effect. Reference in this connection may also be made to the results with thiourea in Example 1b.

20 cc. of 5% rubber solution+0.02 gram of substance+5 cc. of 1% sulphur chloride solution Time of gelling
Blank—no added substance_____minutes__ 21
Potassium hydroxide in glycerol_____do____ 45
Magnesium oxide_____do____ 18
Hydrated lime_____do____ 18
Litharge_____do____ 20
Zinc dithiofuroate_____do____ 21

EXAMPLE 4A

Using proportions as in Example 3 but on another day with different atmospheric conditions, e. g., with respect to temperature, the following results are obtained—

| Accelerator | Time |
|---|---|
| | Minutes |
| Nil | 9 |
| Phenyl-alpha-naphthylamine | 6 |
| Phenyl-beta-naphthylamine | 5 |
| Dinapthylamine | 6 |

EXAMPLE 4B 20 cc. of 7½% rubber solution and 0.05 gram of substance+4 cc. of 5% sulphur chloride solution Time of gelling
Blank _____minutes__ 3
Diamylamine _____do____ 2
Monoamylamine _____do____ 2

EXAMPLE 5

Two substances may be used together for the acceleration of vulcanization by sulphur chloride, the combined effect causing either a quicker gelling as with mercaptobenzothiazole and phenyl-alpha-naphthylamine or a slower gelling as is the case with zinc diethyl-dithiocarbamate and piperidine. In this manner secondary amines may be used in conjunction with other accelerating compounds so that the time of vulcanization may be controlled to any desired extent and improved ageing may be obtained.

20 cc. of 5% rubber solution+0.02 gram of each substance+5 cc. of 1% sulphur chloride solution

| | Time of gelling |
|---|---|
| Blank—no substance added | minutes 21 |
| Mercaptobenzothiazole | do 14 |
| Mercaptobenzothiazole+piperidine | do 3–4 |
| Mercaptobenzothiazole+phenyl-alpha-naphthylamine | do 12 |
| Mercaptobenzothiazole+phenyl-beta-naphthylamine | do 9 |
| Mercaptobenzothiazole+dinaphthylamine | do 11 |
| Mercaptobenzothiazole+diphanylamine | do 14 |
| Zinc diethyldithiocarbamate+phenyl-alpha-naphthylamine | do 1 |
| Zinc diethyldithiocarbamate+piperidine | do 2 |
| Tetramethylthiuram disulphide+phenyl-alpha-naphthylamine | do 3 |
| Tetramethylthiuram disulphide+piperidine | do 3 |

It is of interest that in the product obtained as above the phenyl-alpha-naphthylamine exercises a marked preservative effect. Although consequently the phenyl-alpha-naphthylamine has a stabilizing action on the products of hot vulcanization and cold vulcanization its accelerating effect is limited to the cold vulcanization process.

The advantage of phenyl-alpha-naphthylamine with respect to improvement of the ageing qualities of the cold vulcanization product can also be obtained when it is used in conjunction with other accelerators of sulphur-vulcanization e. g., with zinc diethyl-dithiocarbamate.

Having now described the invention, what we claim is—

1. A method of cold vulcanizing rubber compositions which comprises treating the rubber composition with a relatively small quantity of sulphur chloride in the presence of a member of the group of nitrogen containing hydrocarbon compounds consisting of the following compounds— diphenyl guanidine polysulfide, thiourea, thiocarbanilide, mercaptobenzothiazole, piperidyl pentamethylene dithiocarbamate, sodium pentamethylene dithiocarbamate, zinc diethyl dithiocarbamate, tetramethyl thiuram monosulfide, tetramethyl thiuram disulfide.

2. A method of cold vulcanizing rubber compositions which comprises treating the rubber composition with a relatively small quantity of sulphur chloride in the presence of piperidyl pentamethylene dithiocarbamate.

3. A method of cold vulcanizing rubber compositions which comprises treating the rubber composition with a relatively small quantity of sulphur chloride in the presence of zinc diethyl dithiocarbamate.

4. A method of cold vulcanizing rubber compositions which comprises treating the rubber composition with a relatively small quantity of sulphur chloride in the presence of tetramethyl thiuram monosulfide.

DOUGLAS FRANK TWISS.
ALBERT EDWARD TONEY NEALE.
JOHN ALEXANDER WILSON.